(12) United States Patent
White

(10) Patent No.: US 8,851,541 B2
(45) Date of Patent: Oct. 7, 2014

(54) MODULAR ROBOTIC ACCESSORY SYSTEM

(75) Inventor: Christopher M. White, Frederick, CO (US)

(73) Assignee: Stratom, Inc., Boulder, CO (US)

( * ) Notice: Subject to any disclaimer, the term of this patent is extended or adjusted under 35 U.S.C. 154(b) by 0 days.

(21) Appl. No.: 13/349,463

(22) Filed: Jan. 12, 2012

(65) Prior Publication Data

US 2012/0299322 A1    Nov. 29, 2012

Related U.S. Application Data

(63) Continuation of application No. PCT/US2011/057921, filed on Oct. 26, 2011.

(60) Provisional application No. 61/406,737, filed on Oct. 26, 2010.

(51) Int. Cl.
*B25J 15/04* (2006.01)
*B25J 15/00* (2006.01)

(52) U.S. Cl.
CPC .......... *B25J 15/0475* (2013.01); *B25J 15/0019* (2013.01); *Y10S 901/39* (2013.01)
USPC ................................ 294/213; 294/2; 901/39

(58) Field of Classification Search
USPC ..................... 294/2, 3, 86.4, 213; 901/39, 41; 483/901
See application file for complete search history.

(56) References Cited

U.S. PATENT DOCUMENTS

| | | | | |
|---|---|---|---|---|
| 4,448,405 | A | * | 5/1984 | Cipolla ............................ 269/32 |
| 4,545,723 | A | * | 10/1985 | Clark ............................ 414/730 |
| 4,601,637 | A | * | 7/1986 | Aviles et al. .................. 414/739 |
| 4,741,078 | A | * | 5/1988 | Kimura ............................ 29/39 |
| 4,781,519 | A | * | 11/1988 | Monforte ...................... 414/730 |
| 5,360,249 | A | * | 11/1994 | Monforte et al. .......... 294/119.1 |

* cited by examiner

*Primary Examiner* — Dean Kramer
(74) *Attorney, Agent, or Firm* — Holland & Hart LLP

(57) ABSTRACT

A system is provided in which a robot may be used having a robotic arm with a camera and gripper assembly, that enables the use of tools while also allowing use of a gripper assembly located at the end of the robotic arm. Mounting rails may be secured to the gripper assembly to provide a system that is easily adaptable to allow the relatively fast exchange of different tools. Tools may be secured to the mounting rails to allow for both the use of the tools and the existing gripper assembly on the robotic arm. The accessories may be configured to allow enhanced viewing of the accessory through a camera mounted to the robotic arm.

4 Claims, 10 Drawing Sheets

MODULAR ROBOTIC ACCESSORY SYSTEM

BACKGROUND

Both military and civilian police and security personnel can encounter situations in which it is desirable to remotely inspect or handle dangerous or potentially dangerous items. For example, it may be desirable to inspect items not in plain view, covered by a tarp or bag for example, to determine what the item is and whether the item poses any danger to persons or property nearby. In cases where a dangerous item has been discovered, such as an explosive device, it is beneficial to remotely disable or disarm the item. For example, a package adjacent to a road may be discovered and suspected to be a roadside bomb. A remotely operated robot may be used to view and potentially disable the bomb.

Such robots generally include an arm that has a gripper assembly and a camera. An operator located a safe distance away operates the robot using a video feed from the camera to inspect the item, and using the gripper to move or otherwise access the item. In many cases the arm, as mentioned, has a gripper that may be used to grasp and rotate an object. In some situations, the gripper may hold another tool that may be useful in a particular situation, such as a probe for probing soil that may be used to cover a control line that could be used to detonate an explosive device. When using such a tool, the gripper is generally not available for other tasks, as it has to hold the tool of interest. Furthermore, in many cases the tool is not held in a manner by the gripper to as to allow the operator to have a good view of the tool through the video feed from the camera.

SUMMARY

The present disclosure recognizes it would be useful to have a system in which a robot may be used having a robotic arm with a camera and gripper assembly, that enables the use of tools while also allowing use of a gripper assembly located at the end of the robotic arm. It would be advantageous to have such a system that is easily adaptable to allow the relatively fast exchange of different tools and is straightforward to use. Embodiments described herein provide robotic accessories that are easily mountable to a robotic arm, allowing use of an existing gripper assembly on the robotic arm. In some embodiments, the accessories are configured to allow enhanced viewing of the accessory through a camera mounted to the robotic arm. The accessory system of an embodiment includes a securement mechanism that secures multiple different accessories to a gripper assembly. The securement mechanism, in an embodiment, is a Picatinny mounting rail that is contoured to match the back surfaces of the robotic gripper assembly. Attachment brackets hold the rail to the gripper assembly while allowing continued functionality of the gripper assembly. Mounting blocks may then be secured to the rails, with tool attachments secured of the mounting blocks. In such a manner, the securement mechanism allows tools to be used on the robot while also allowing the use of the gripper.

These and other advantages and novel features of the disclosure will be set forth in part in the description which follows, which discloses various embodiments, including the currently preferred embodiment.

DETAILED DESCRIPTION

Figure 1:
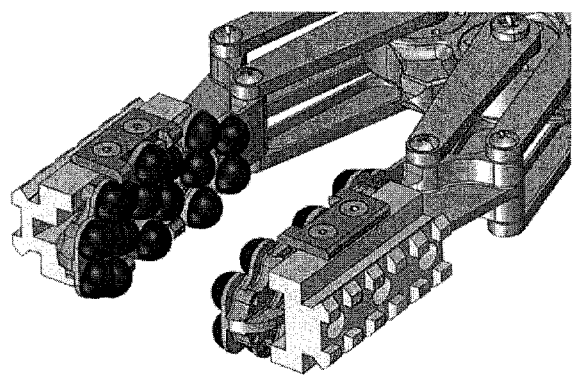
FIG. 1 illustrates a robotic gripper assembly with a securement assembly according to an exemplary embodiment.

For a more complete understanding of this invention, reference is now made to the following detailed description of several embodiments as illustrated in the drawing figures. Various embodiments are described herein, with specific examples provided in many instances to serve to illustrate and discuss various concepts included in the present disclosure. The specific embodiments and examples provided are not necessarily to be construed as preferred or advantageous over other embodiments and/or examples. Furthermore, concepts described herein may be used with numerous different settings and situations.

The present invention is generally directed to systems and methods for mounting and using various different accessories on a robotic system that allow for the continued use of a robotic gripper assembly on the robotic arm. In some embodiments, the accessories allow for a remote operator to view the accessories on a video feed from a camera that is also mounted on the robotic arm. Embodiments described herein use a modular system that includes a securement mechanism onto which multiple different accessories may be mounted, depending upon the particular situation to be addressed by the robot. Such a system provides the ability to gain access in a relatively quiet and efficient manner with the tools believed to be useful for the situation while allowing for continued use of a robotic gripper assembly. The system, in some embodiments, uses mounting blocks that may be secured to the securement mechanism using set screws, for example. Different tools may me secured to the mounting blocks and thereby used by the robot. The securement mechanism is secured to an outer surface of opposing parts of the gripper assembly, allowing for the continued use of the gripper assembly.

Figure 2:
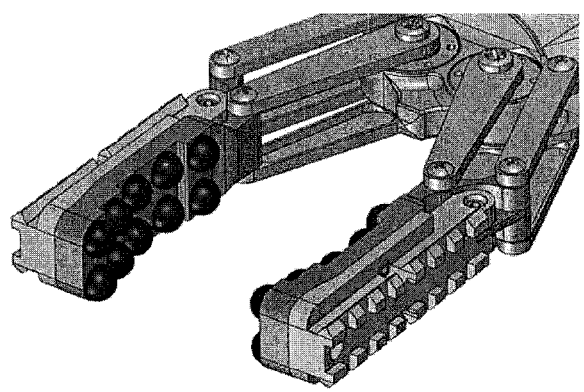
FIG. 2 illustrates a robotic gripper assembly with a securement assembly according to another exemplary embodiment.
Figure 3:
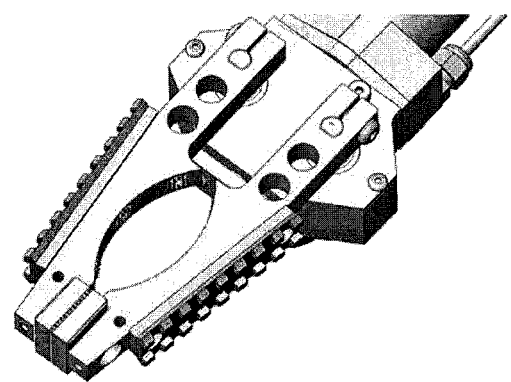
FIG. 3 illustrates a robotic gripper assembly with a securement assembly according to another exemplary embodiment.

With reference to the drawings, embodiments of a modular accessory system are described. Such systems may be used by numerous different agencies or security organizations, such as military EOD technicians, bomb squads, United States Homeland Security, and first responders, to name a few examples. The capabilities of the system allow for access and diagnosis of VBIED, IED and CBRN devices and for remote surveillance, such as through cameras. FIGS. 1-3 illustrate securement mechanisms of three embodiments, comprising a Picatinny mounting rail that is contoured to match the back surfaces of the robotic gripper assembly. Attachment brackets hold the rail to the gripper assembly while allowing continued functionality of the gripper assembly. FIG. 1 illustrates a securement mechanism comprising Picatinny rails that are mounted to the outside of the gripper arms of an iRobot SUGV robot. FIG. 2 illustrates a securement mechanism comprising Picatinny rails that are mounted to the outside of the gripper arms of an iRobot PakBot robot. FIG. 3 illustrates a securement mechanism comprising Picatinny rails that are mounted to the outside of the gripper arms of a Foster-Miller Talon robot. As will be readily understood by one of skill in the art, the securement mechanisms can be adapted to be mounted to any of numerous different types of robots and gripper assemblies or arms that are used by such robots.

Figure 4:
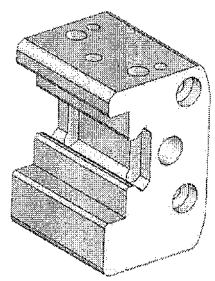
FIG. 4 illustrates a mounting block of an exemplary embodiment.
Figure 5:
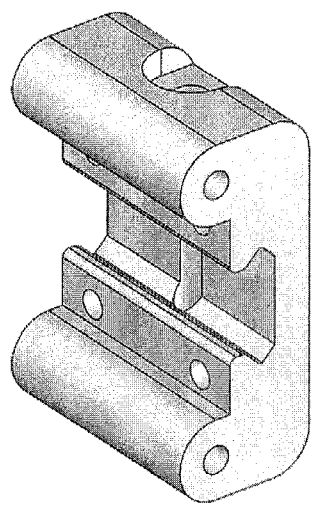
FIG. 5 illustrates a mounting block of another exemplary embodiment.

FIGS. 4 and 5 are illustrations of embodiments of mounting blocks that may be secured to the rails. The mounting block of FIG. 4, extends away from the rail, while the mounting block of FIG. 5 has a lower profile that does not extend away from the rail to the same extent as the block of FIG. 4. Depending upon the tool that is to be attached to the mounting block, the embodiment of FIG. 4 or FIG. 5 may provide a tool location that is preferred to provide enhanced use of the gripper while the tool is attached to the mounting block, and/or a tool location that is better within the field of view of a camera attached to the robotic arm. As will be understood, one rail assembly and an associated mounting block is attached to each side of the gripper assembly. The mounting block may be secured to the rail using any appropriate technique, such as through the use of set screws or clamps, for example.

Figure 6:
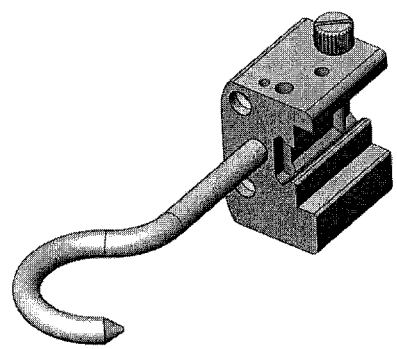
FIG. 6 illustrates an adder hook tool attachment according to an exemplary embodiment.
Figure 7:
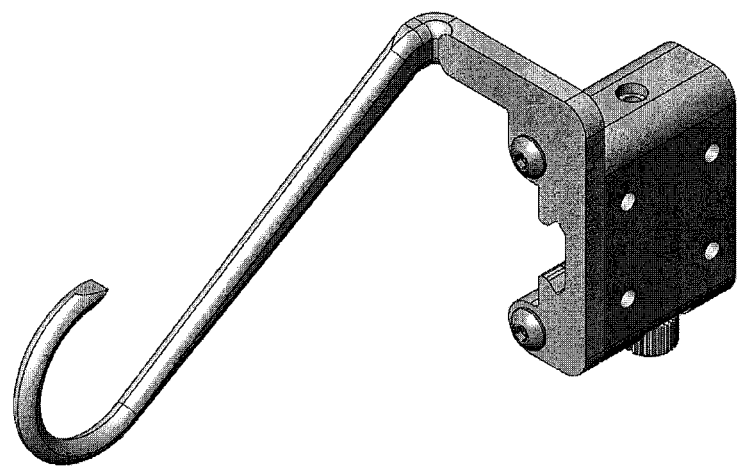
FIG. 7 illustrates an adder hook tool attachment according to another exemplary embodiment.
Figure 8:
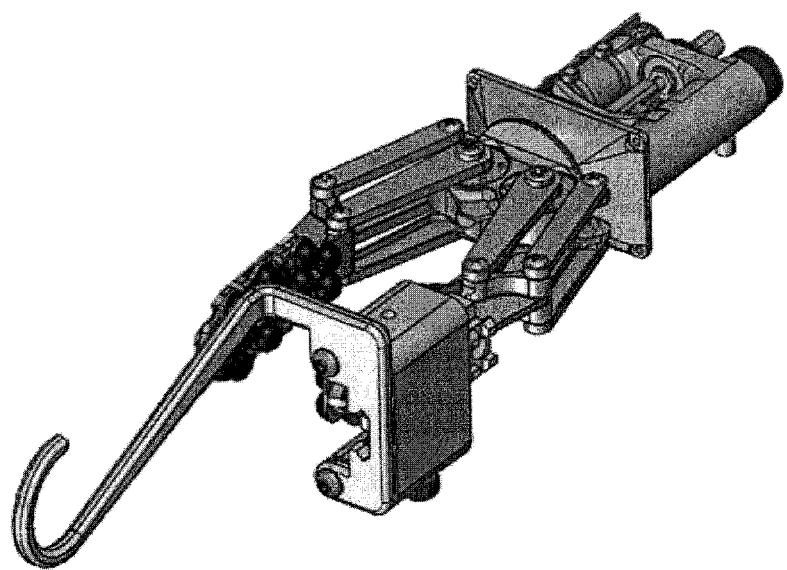
FIG. 8 illustrates the hook of FIG. 7 mounted on one half of a gripper assembly according to an exemplary embodiment.

Referring now to FIGS. 6 and 7, adder hook tool attachments of two embodiments are illustrated. Hooks such as those of FIGS. 6 and 7 may be used to provide an operator the ability to hook an item. The embodiment of FIG. 6 illustrates a hook located substantially outside of an interior space of the gripper assembly, and the embodiment of FIG. 7 illustrates the hook offset from the mounting block and located at an angle. Such an embodiment can provide increased camera visibility and usability of the hood relative to the embodiment of FIG. 6, which may provide increased usability of the gripper assembly as compared to the embodiment of FIG. 7. FIG. 8 illustrates the hook of FIG. 7 mounted on one half of a gripper assembly.

Figure 9:
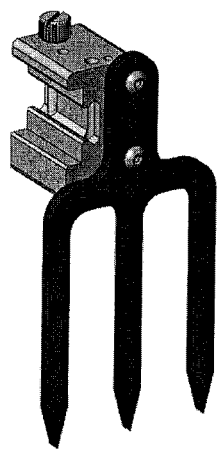
FIG. 9 illustrates a rake accessory for a robotic arm according to an exemplary embodiment.
Figure 10:
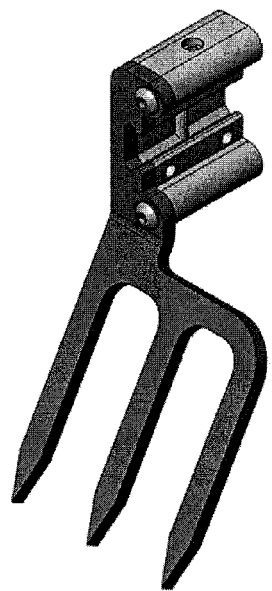
FIG. 10 illustrates a rake accessory for a robotic arm according to another exemplary embodiment.
Figure 11:
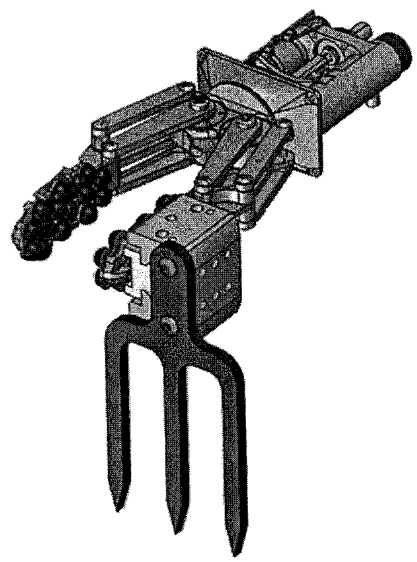
FIG. 11 illustrates the rake tool of FIG. 9 on one half of a gripper assembly according to an exemplary embodiment.
Figure 12:
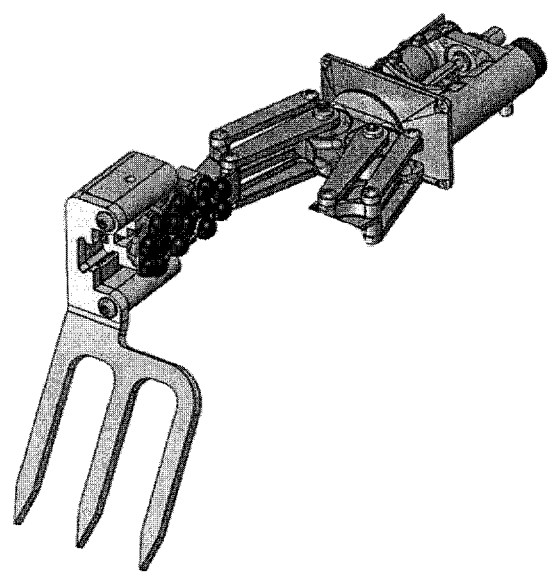
FIG. 12 illustrates the rake tool of FIG. 10 on one half of a gripper assembly according to an exemplary embodiment.

Referring now to FIGS. 9 and 10, embodiments of a rake accessory for a robotic arm are illustrated. Such rake accessories may allow an operator to rake portions of the ground to move material, to loosen soil, or to try and determine if any objects are hidden under soil or other material, for example. The embodiment of FIG. 9 illustrates the rake centered relative to a mounting plate where it attaches to a mounting block. The embodiment of FIG. 9 also has a rake that is planar relative to the mounting plate. The embodiment of FIG. 10 illustrates a rake with an offset fork relative to a mounting plate that attaches the rake to the mounting block Such an offset fork can bring the entire rake better within the field of view of a camera mounted to a robotic arm for some embodiments. The embodiment of FIG. 10 also includes a rake portion that has a bend, 30 degrees in this embodiment, that allows the tool to be more perpendicular with the ground when mounted to robotic arms in some applications. FIGS. 11 and 12 illustrate robotic arms and gripper assemblies having a rake tool of FIGS. 9 and 10, respectively, mounted to one side of the gripper assembly.

Figure 13:
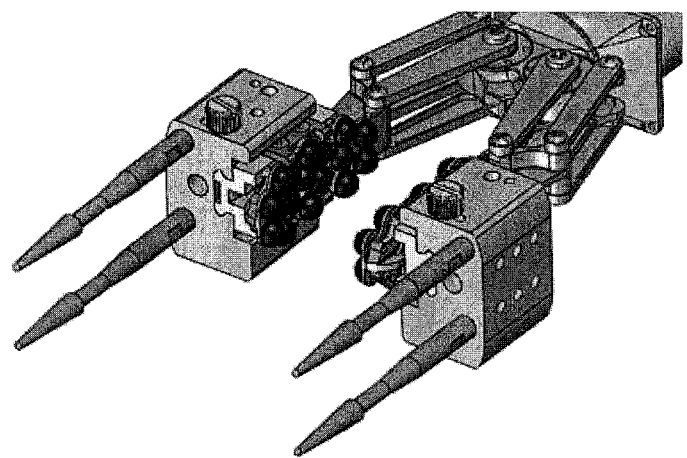
FIG. 13 illustrates a probe tool according an exemplary embodiment.
Figure 14:
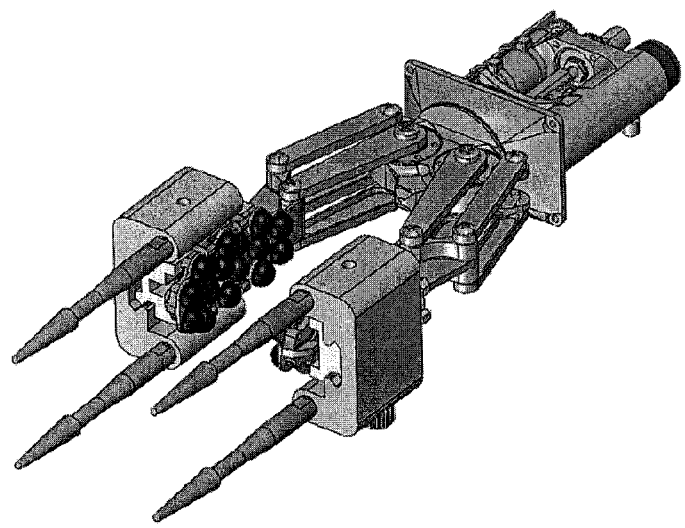
FIG. 14 illustrates a probe tool according another exemplary embodiment.
Figure 15:
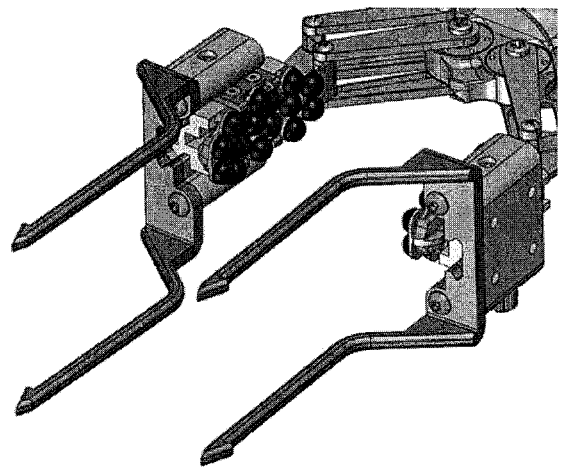
FIGS. 15-16 illustrate a probe tool according another exemplary embodiment.
Figure 16:
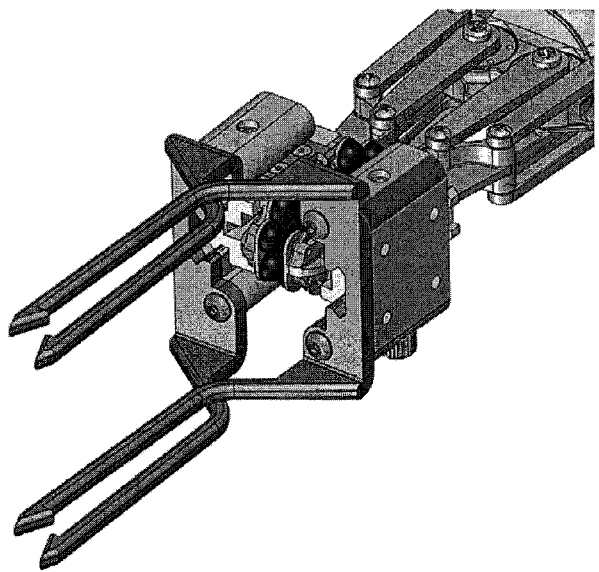

Referring now to FIGS. 13-16, embodiments of a probe tool are illustrated. The illustrated probe tools provide a multiple probe attachments on each mounting block, which may be attached to a gripper in a manner as described above. The embodiments of FIG. 13 and FIG. 14 illustrate two possible configurations of the probes when attached to the mounting blocks and gripper assembly. Such probe tools may be used on a gripper assembly to provide, for example, an explosive ordnance disposal (EOD) team the ability to remotely expose and wind up or spool wire that is connected between an explosive and detonator on an improvised explosive device. Using such a probe tool, an operator may expose buried wires, spool up a section of the wire, and detach the wire from the TED. The probe tool may be pushed in or dragged through dirt to expose such wires. When the wires are exposed, the gripper assembly on the robotic arm can be rotated until the wire is wrapped around the probes on the tool. The probes can then be freed from the wire by closing the gripper assembly and pulling the probes out of the spooled wire. Each probe in the illustrated embodiments include a barb or reduction on an outer portion of the probe that enhances the ability to capture the wire as it is being wrapped around the probes. Such probe tools provide enhanced ability for use of robotic devices by EOD teams, by reducing the need to attempt to use a gripper assembly itself to capture such wires, which can be difficult with smaller gauge wire and also result in the gripper becoming tangled in wire and trapping the robot. Such a situation can result in a surrendered robot, or the potentially dangerous task of attempting to retrieve the robot. Furthermore, such probe tools can reduce the number of trips a robot may need to take to a site of interest by allowing for both the exposure and spooling of wire in such cases. FIGS. 15 and 16 illustrate another embodiment of a probe tool that is mounted to mounting blocks that can be secured to a gripper assembly. In this embodiment, each probe is vertically offset from a mounting plate to allow for the probes to fully close and even overlap, to further enhance the ability to remove spooled wire. Such a probe configuration also, in certain applications, provides better viewing of the probes by a robotic camera.

Figure 17:
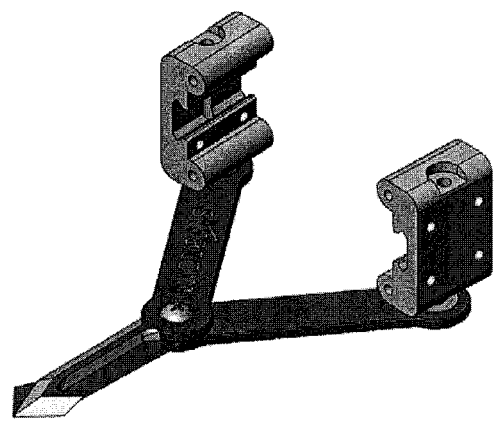
FIGS. 17-19 illustrate a multi-purpose tool according an exemplary embodiment.
Figure 18:
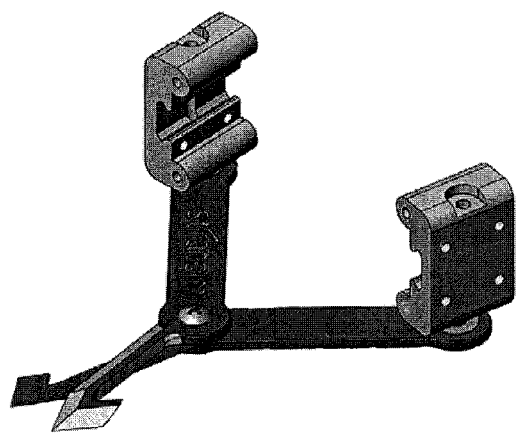
Figure 19:
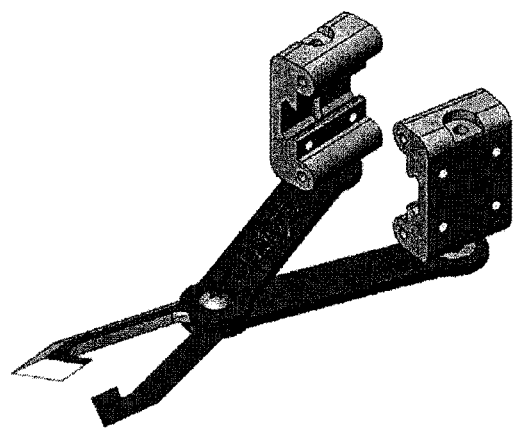

With reference now to FIGS. 17-19, a multi-purpose tool that may be secured to a gripper assembly is illustrated. In this embodiment, a multi-utility knife may be used for multiple purposes such as, for example, initial reconnaissance and remote render safe of IEDs. This highly adaptable tool can pierce, rip, pry, and attach to an IED. It is also capable of cutting wire and other materials with the scissor section or serrated section of the tool. The multi-purpose tool of this embodiment is attached to a gripper assembly using the mounting blocks and securement mechanism as described above. When the gripper assembly is opened and closed, the two blades of the multi-purpose tool are oriented relative to each other to provide different uses. This tool comprises two blades that pivot on each other like a pair of scissors. Each blade has a double edge, a hook, and a pointed tip. Starting just past the connection pivot, the topside of the blade is sharpened around the outside profile until is meets back with the pivot. In some embodiments, one or more portions of the blades may include a serrated section. When the gripper assembly is opened to the position as illustrated in FIG. 17, the tool may be used to pierce or pry, for example. When the tool is positioned as illustrated in FIG. 18, it may be used to rip material, for example. And, when the tool is positioned as illustrated in FIG. 19, it may be used to cut material or wire.

As will be readily recognized, such a system may be used in many different applications where access and/or inspection of a space of interest or item of interest is required. For example, systems of various embodiments may be used to penetrate bags, such as a duffel bag or backpack that may contain an explosive device, and to remotely inspect and potentially disarm potentially dangerous items. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An accessory system for a robotic platform, comprising:
   a securement mechanism having a first side and a second side, the first side configured to be coupled with a working arm of a robotic platform and the second side is configured to be coupled with an accessory to be used by the robotic platform, and
   an accessory having a working end and an attachment end, the attachment end removably couplable with the second side of the securement mechanism,
   wherein the working arm of the robotic platform includes a gripper assembly comprising a pair of opposing jaws, each jaw having a gripping surface located on an inside surface thereof that faces the opposing jaw, and
   wherein the first side of the securement mechanism is coupled to an outside surface of one of the jaws, the outside surface opposite of the inside surface of the associated jaw and wherein the accessory, when coupled with the securement mechanism, allows for use of the gripping surfaces in addition to the use of the accessory in operations of the robotic platform.

2. The system of claim 1, wherein the accessory is selected from a plurality of accessories, each of the plurality of accessories having a working end and an attachment end, the attachment end removably couplable with the second side of the securement mechanism.

3. The system of claim 1, wherein the securement mechanism comprises a mounting rail, and the first side is contoured to match the outside surface of the associated jaw of the robotic gripper assembly.

4. The system of claim 3, wherein the robotic gripper assembly includes a pair of securement mechanisms, the first side of each securement mechanism coupled with one of the jaws and the second side of each securement mechanism coupled with different portions of a first accessory, and wherein the inside surfaces of each jaw may continue functional use when the first accessory is coupled with the securement mechanisms.

* * * * *